Aug. 23, 1966
W. E. THORNTON
3,267,934
ELECTROCARDIAC COMPUTER
Filed Sept. 20, 1962
4 Sheets-Sheet 1
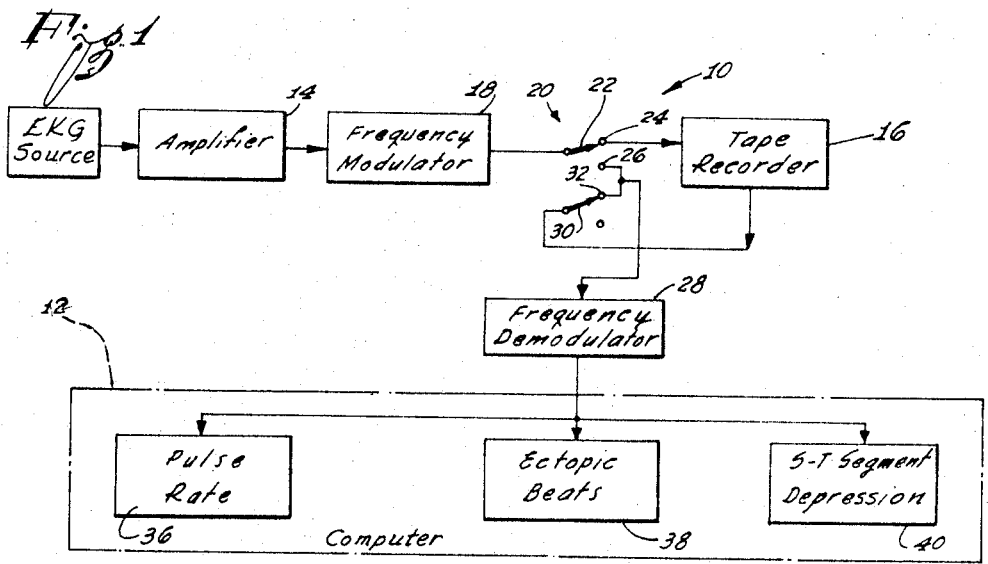
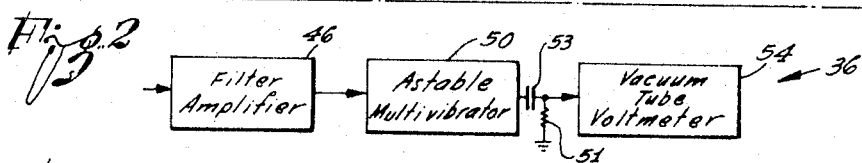
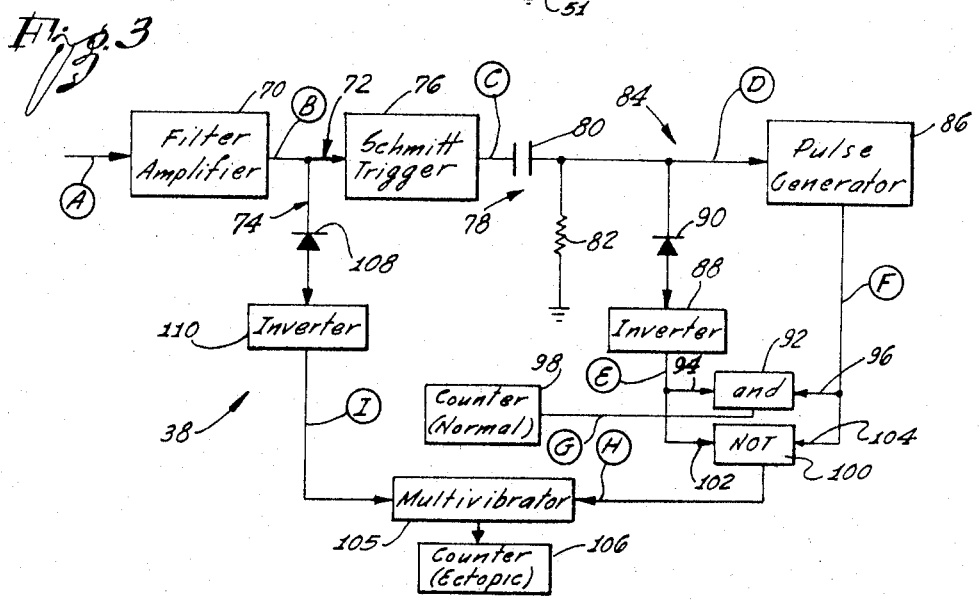
INVENTOR:
William E. Thornton
By Smyth, Roston & Pavitt,
Attorneys

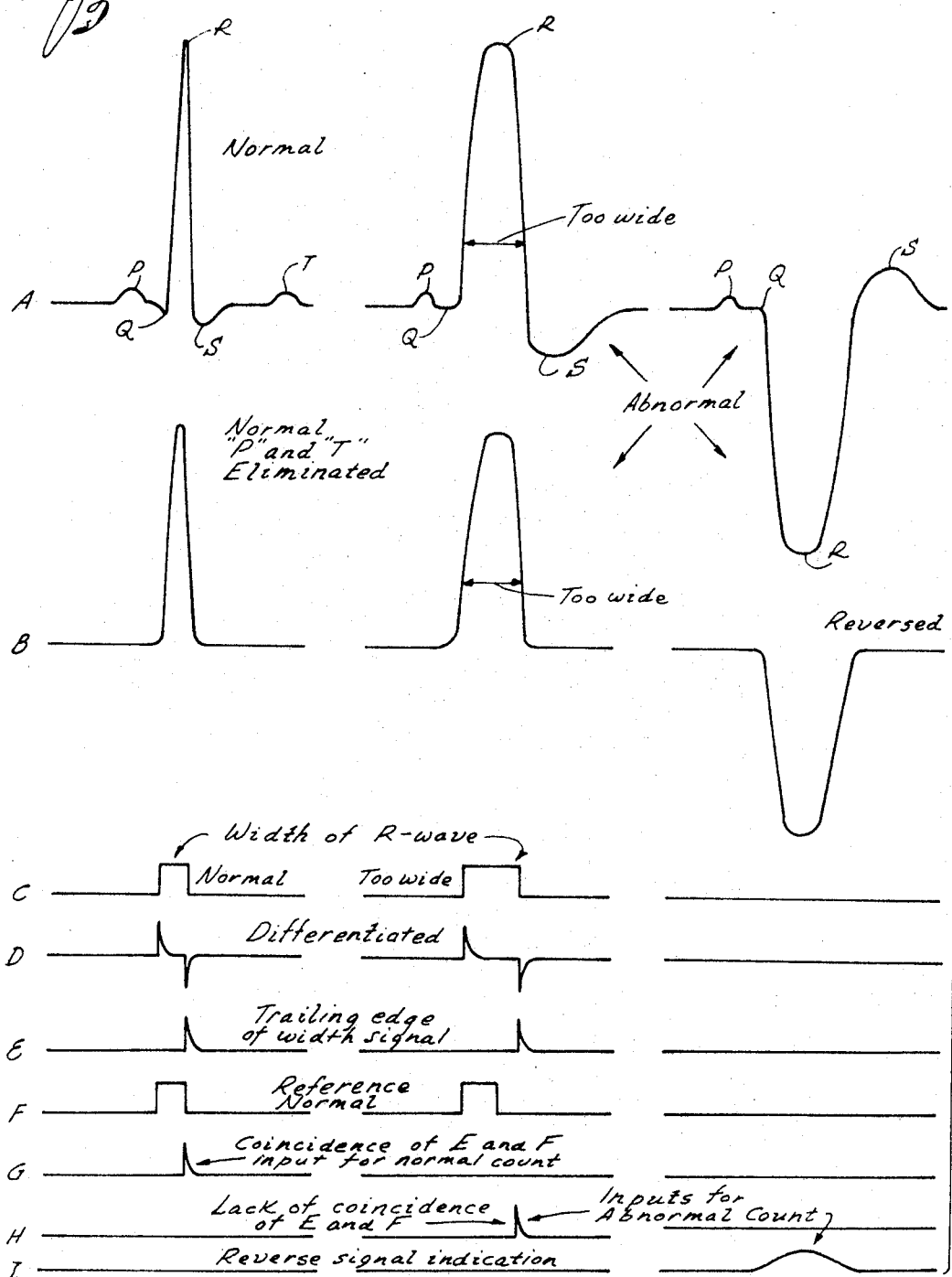

Aug. 23, 1966  W. E. THORNTON  3,267,934
ELECTROCARDIAC COMPUTER
Filed Sept. 20, 1962  4 Sheets-Sheet 3
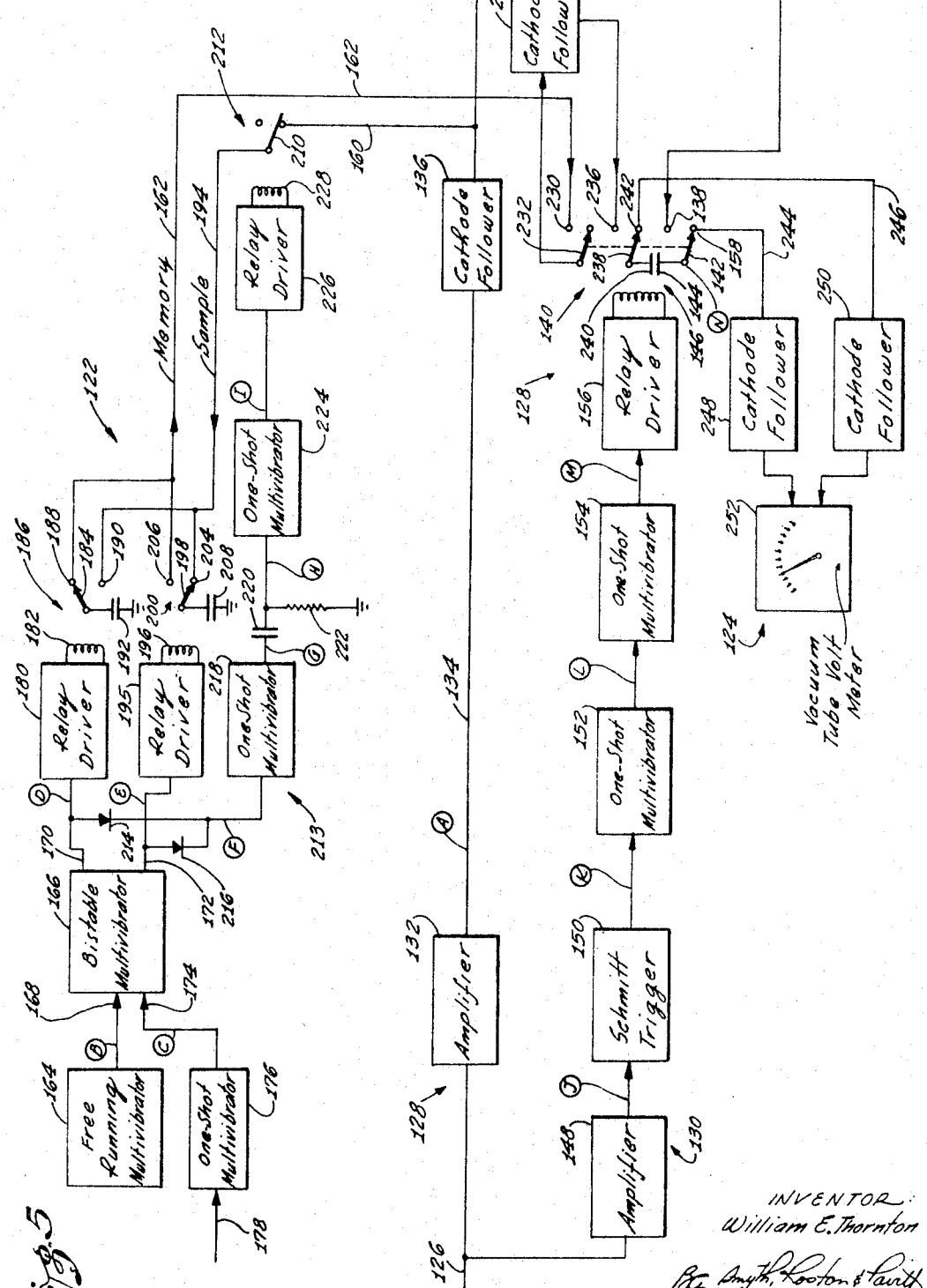
INVENTOR.
William E. Thornton
By Smyth, Roston & Pavitt
Attorneys

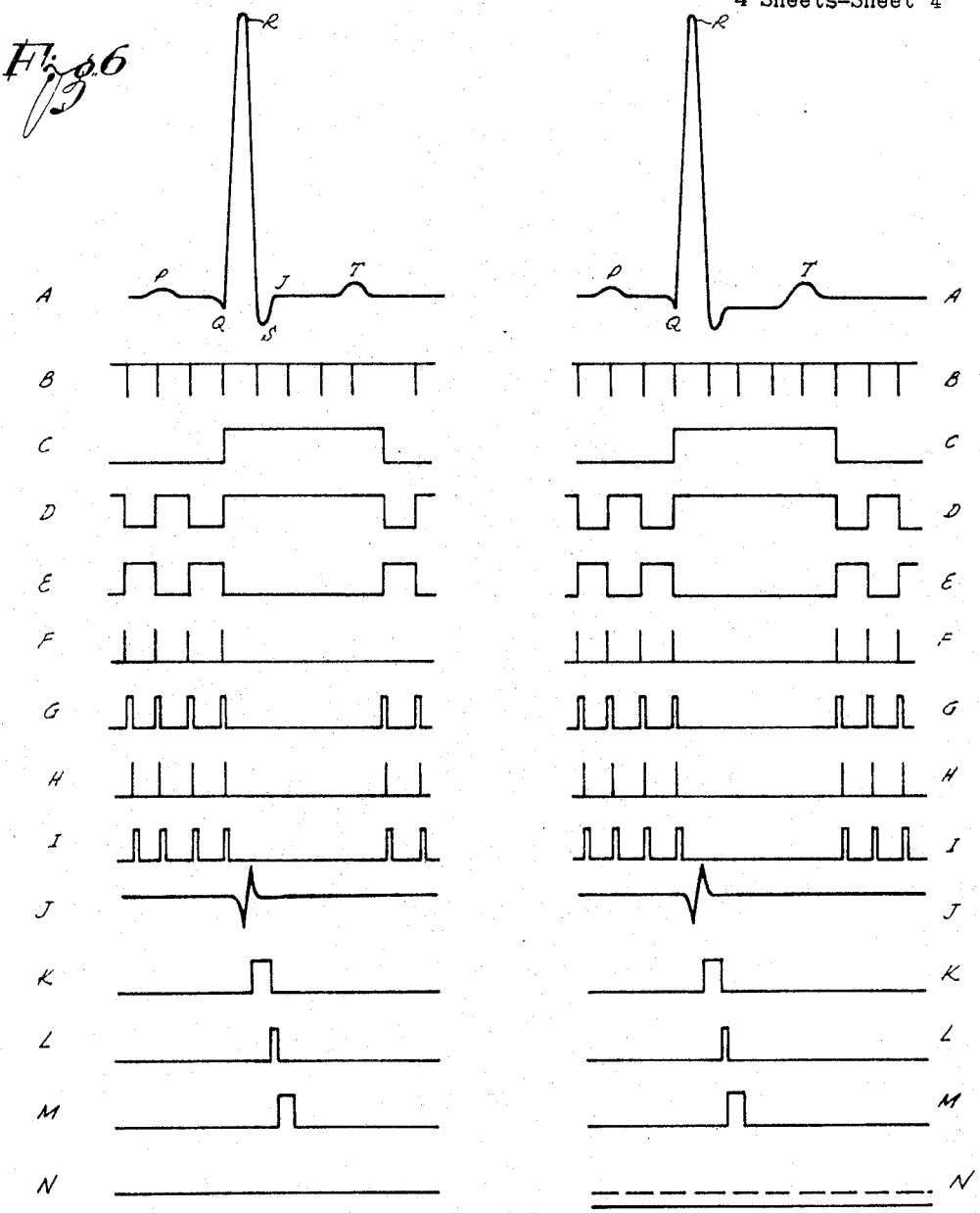

United States Patent Office 3,267,934
Patented August 23, 1966

3,267,934
ELECTROCARDIAC COMPUTER
William E. Thornton, Chapel Hill, N.C., assignor to Avionics Research Products Corporation, Venice, Calif., a corporation of California
Filed Sept. 20, 1962, Ser. No. 224,969
23 Claims. (Cl. 128—2.06)

The present invention relates to means for processing electrocardiac signals and, more particularly, to computer means for obtaining large quantities of electrocardiac signals and automatically processing the electrocardiac signals to indicate the presence and character of certain forms of abnormalities therein.

As is well known, the human cardiac muscle produces electrical signals that radiate throughout the body and upon the surface of the skin. These electrocardiac signals result from expansions and contractions of the cardiac muscle and have many known relationships thereto. By placing electrodes on a patient's skin, these electrocardiac or EKG signals may be sensed. Furthermore, by interconnecting the electrodes with a suitable cathode ray oscilloscope, electrocardiograph or a similar device, the EKG signals may be visually presented for viewing by an electrocardiologist.

Customarily, the EKG signals are recorded as a graph on a paper tape for subsequent study and analysis. The resultant graph or electrocardiogram will permit visually observing the EKG signal and a determination of the characteristics thereof.

Normally, the EKG signal will include a group of pulses or waves that result from depolarization of the ventricles prior to contraction and are commonly referred to as the QRS complex. Immediately preceding this complex there is normally a small pulse that results from the initiation of the muscular activity and is referred to as the P wave. Following the QRS complex there is normally at least one additional pulse referred to as the T wave and separated from the QRS complex by the so-called ST segment. Following the completion of one pumping action and prior to the succeeding pumping action, the cardiac muscle relaxes and the EKG signal will be essentially quiescent with little or no fluctuation in the amplitude thereof.

In a normal healthy heart the pulse rate, the rhythm thereof, the shape of the QRS complex, and the amplitude of the ST segment have certain predetermined characteristics and fall within certain limits. However, in the event the cardiac muscle is subject to abnormal strain and/or has one or more infirmities therein, the EKG signal may have one or more differences from a normal EKG signal. For example, the rate and/or rhythm of the heart beat may be erratic and vary throughout wide limits. In addition, both the size, shape and time duration of the QRS complex and the ST segment following it may vary substantially from the normal.

At the present time the most common and practical means for determining whether a heart has certain types of abnormalities and the nature thereof has been to obtain an electrocardiogram and to manually study or analyze the electrocardiogram to determine if it is normal or not. Heretofore this has required the services of a highly skilled electrocardiologist who must expend large quantities of time reviewing the electrocardiogram. This is not only a very time-consuming process but is also very wasteful of a highly skilled person.

Although many heart disorders have been detected in this manner, particularly during their more advanced stages, it has been found that a failure to detect an abnormal EKG signal has not been an altogether reliable indication of a normal and healthy heart. More particularly, it has been found that some forms of disorders, especially during their early stages, produce abnormal EKG signals at only random and infrequent intervals and/or only when the patient is engaged in certain forms of activities. Accordingly, in order to obtain a record of such abnormal EKG signals, it is necessary to make recordings that extend over long periods of time. This, in turn, results in an accumulation of such large volumes of data that it has been impractical to spend the prohibitive amounts of time required for carefully reviewing the recordings. In addition to being an inefficient use of the time of a highly skilled person, it is extremely difficult, if not impossible, for an operator to manually examine the large volume of data and accurately identify random and infrequent abnormalities of transient and dynamic nature. It may thus be seen that although electrocardiographs have been very valuable, they have not been entirely satisfactory as they are subject to numerous operating difficulties that have limited their usefulness, particularly in routine checkups for detecting ailments during their early stages.

It is now proposed to provide electrocardiographic means that overcome the foregoing difficulties. More particularly, it is proposed to provide electrocardiographic means that will permit large volumes of EKG signals to be accumulated from a patient over an extended period of time and will then automatically process said signals. This will not only reduce the amount of time required for analyzing the signal, but will also insure detecting and identifying of abnormal beats of certain types which may have occurred during an extended recording period. If any abnormal beats have been automatically detected and located, the cardiologist may concentrate his entire attention on such beats, thereby making a more efficient use of his skills. This is to be accomplished by providing electrocardiographic means having a computer that will process the EKG signal and will be effective to identify certain preselected characteristics or abnormalities in the EKG signal and to indicate the occurrence of such signal.

More particularly, it is an object of the present invention to provide electrocardiographic means that will be effective to sense the heart rate and to continuously indicate the rate at which the heart is beating.

It is also an object to provide electrocardiographic means which will be effective to sense the occurrence of ventricular ectopic beats that produce abnormalities in the QRS complex portion of the EKG signal.

It is a further object to provide electrocardiographic means which will be effective to sense and indicate the amount of depression of the ST segment.

These and other features, advantages and objects of the present invention will become readily apparent from the following detailed description of one form of the present invention, particularly when taken in connection with the accompanying drawings wherein like reference numerals refer to like parts, and wherein:

FIGURE 1 is a block diagram of an electrocardiographic means embodying one form of the present invention;

FIGURE 2 is a block diagram of a portion of the electrocardiographic means for indicating the rate of the pulse beat;

FIGURE 3 is a block diagram of a portion of the electrocardiographic means for identifying ectopic beats;

FIGURE 4 is a series of waveforms present in various portions of the block diagram of FIGURE 3 during various types of operating conditions;

FIGURE 5 is a block diagram of a portion of the electrocardiographic means for measuring the ST segment depression; and FIGURE 6 is a series of waveforms present in various portions of the block diagram of FIGURE 5.

Referring to the drawings in more detail, the present invention is embodied in electrocardiographic means 10 having a computer 12 therein for receiving and processing the electrocardiac or EKG signals. These EKG signals may be obtained by any suitable means such as by placing a pair of electrodes on the external surface of a person's chest in the standard lead positions. Although the various characteristics of EKG signals obtained in this manner may vary throughout a wide range, as a general rule in a normal or healthy person the EKG signal will have a waveform similar to the classical form shown in the first example of line A of FIGURE 4, and the first example of line A of FIGURE 6. This wave includes, in the following sequence, a P wave of positive polarity, a QRS complex consisting of a negative Q wave, a positive R wave and a negative S wave, and finally, a T wave that is separated from the QRS complex by an ST segment. Although there may be several additional waves present in a normal EKG signal, since they will have little or no effect on the operation of the present invention, for purposes of simplicity the present description will be confined to waveforms of this general nature.

Normally, the EKG signals will occur periodically at a frequency on the order of about 60 to 80 beats per minute, but under abnormal circumstances the pulse rate may be very erratic and fall to zero or rise to a few hundred beats per minute. The P wave is normally a small, positive pulse that corresponds to the initial impulse that triggers the commencement of the heartbeat and the resulting reflex expansions and contractions thereof. Immediately following the P wave, there is a quiescent portion of substantially uniform amplitude. Normally, this portion will have a time duration on the order of greater than 0.04 second and will have a constant or fixed amplitude that may be used as an isoelectric signal. As a result, the amplitude of this section may be employed as a reference against which the remaining portions or waves of the EKG signal may be measured.

At the conclusion of the isoelectric signal, the QRS complex occurs. This complex precedes the ventricular contraction producing the actual pumping action. The complex commences with a so-called Q wave which is a small negative pulse. The Q wave is succeeded by the R wave, which is the most conspicuous portion of the EKG signal. It comprises a positive pulse having an amplitude greater than any of the other waves present in the EKG signal. Normally, the R wave will have the appearance of a "spike" with a sharp rise and fall and a relatively short duration. More particularly, it is believed that the maximum time duration will normally be on the order of up to 0.03 to 0.04 second. However, certain types of abnormalities such as premature ventricular beats result from an ectopic focus (or foci) of depolarization in the ventricle and may result in an EKG signal characterized by a distortion of the R wave and particularly an increase thereof. For example, the ectopic beat may correspond to the second example in line A of FIGURE 4 wherein the R wave may last on the order of at least 0.06 to 0.08 second or longer. In other forms of premature ventricular beats such as in the third example of line A of FIGURE 4, the R wave may even be inverted or of negative polarity.

Following the R wave the QRS complex terminates in an S wave. The S wave may be similar to the Q wave in that it is usually a small negative pulse.

Following the QRS complex, there will normally be a T wave which is separated from the S wave by the so-called ST segment. The amplitude of this segment will normally be approximately equal to the isoelectric portion between the termination of the P wave and the commencement of the Q wave as in the first examples of lines A in FIGURES 4 and 6. However, some forms of abnormalities such as an ischemia (myocardial) may cause the amplitude or level of the ST segment to be substantially depressed or more negative than the isoelectric portion, as in the second example in line A of FIGURE 6 while some forms of abnormalities such as an infarction may cause the ST segment to be elevated.

The input to the electrocardiac means 10 preferably includes an amplifier 14 that is effective to increase the amplitude of the EKG signal to a more useful level. The amplifier 14 may be connected directly with the pickup electrodes by one or more conductors. If desired, it may be indirectly connected with the electrodes by means of a telemetry system wherein a radio transmitter is connected with the electrodes so as to radiate a signal modulated with the EKG signal and a radio receiver receives the radiated signals and feeds them to the input of the amplifier 14.

The amplifier 14 may be of any conventional design. However, it must provide a uniform amount of gain over an adequate bandwidth to effectively amplify all of the components in the EKG signal without any distortions thereof. The output signal from the amplifier 14 will thus be a faithful reproduction of the EKG signal but of increased amplitude. That is, the signal will be of substantially identical shape to the original EKG signal.

Although the output of the amplifier 14 may be fed directly into the computer 12 for real time and concurrent processing thereof, it has been found desirable to preserve a permanent record of the signal. This record is preferably of a form that will permit the EKG signal to be easily reproduced in either real time or accelerated time. In the present instance, a tape recorder 16 is provided for magnetically recording the signal on a magnetic tape. The tape recorder 16 is preferably of a conventional and readily available variety.

Since the EKG signals are of a low frequency and it is desirable to employ a conventional tape recorder 16, it has been found desirable to provide a frequency modulator 18 that will have a carrier frequency that will be easily recordable on the magnetic tape. For example, the carrier frequency may be on the order of 2,500 cycles per second. As a result, the frequency response of the tape recorder 16 will be in a bandwidth including 2,500 cycles per second plus and minus the side band signals.

It has been found that, with a carrier frequency in this range, the resultant frequency-modulated signal may be recorded by means of a conventional tape recorder without extensive modifications thereto and the very low frequency components within the EKG signal will not be lost.

The output of the frequency modulator 18 is interconnected with a switch mechanism such as a double pole-double throw switch 20. One of the movable contacts 22 is connected to the output of the modulator 18 and one of the fixed contacts 24 therefore is connected with the input to the tape recorder 16. The fixed contact 26 is connected to the input to a frequency demodulator 28. The other movable contact is connected to the output of the tape recorder 16 while the fixed contact 32 associated therewith is connected to the input of the frequency demodulator 28. It may thus be seen that if the switch 20 is in the position shown, a signal modulated by the EKG signal may be directed from the modulator 18 to the tape recorder 16 for recording on a magnetic tape. At the same time, the frequency modulated signal, as reproduced by the tape recorder 16, may be fed into the demodulator 28. In the other position the switch will be effective to feed the frequency modulated signal directly from the modulator 18 to the frequency demodulator 28.

It may thus be seen that the switch 20 will feed a frequency modulated signal from either the frequency modulator 18 or from the tape recorder 16 into frequency demodulator 28. The frequency demodulator 28 may be of any suitable variety for demodulating the signal so as to recover the original EKG signal from the frequency modulated signal. The output signal from the demodulator 28 will thus be substantially identical to the EKG signal originally obtained from the patient and fed into the amplifier 14.

The output from the demodulator 28 may be interconnected with the input to the computer 12 so as to supply the EKG signal to the various portions thereof. Although the computer 12 may include a wide variety of portions for accomplishing a wide variety of objectives, the present computer 12 includes a pulse rate section 36, an ectopic beat section 38, an ST segment depression section 40.

The pulse rate section 36 which is shown in block form in FIGURE 2, has an input which is adapted to be interconnected with the output of the frequency demodulator 28 so as to receive the EKG signal therefrom. The input may include a filter-amplifier 46 through which the EKG signal will pass. This filter-amplifier 46 which may be of substantially conventional design is effective to filter out or suppress the P, Q, S and T waves. Thus the output from the filter-amplifier 46 will be a pulse corresponding to an amplification of the R wave. Accordingly, there will be a pulse from the filter-amplifier 46 each and every time that an R wave occurs so that these pulses will have the same frequency or rate as the EKG signal.

The output from the filter-amplifier 46 may be interconnected with the input to a circuit such as an astable multivibrator circuit 50. This multivibrator circuit 50 is responsive to the amplitude of the signal on the input whereby the potential on the output will be low when the input is low. However, each time the potential on the input rises above a predetermined level, the multivibrator 50 will change its state so that the potential of the output will be high. The duration of this condition will be a predetermined time interval. As a consequence, the output from the multivibrator 50 will be a series of squarewave pulses that have constant amplitudes and constant time durations. The frequency of these pulses will be identical to the frequency of the EKG signal and the duration of the pulses is preferably a small fraction of the period between the R waves. The output from the multivibrator 50 is interconnected with a resistor 51 and condenser 53 so that the pulse will be applied thereto. A suitable meter such as a vacuum tube voltmeter 54 may be interconnected across the resistor 51 to indicate the voltage drop across the resistor 51.

When the output from the multivibrator 50 is high, the condenser 53 will acquire a charge having a potential corresponding to the potential of the pulse from the multivibrator 50. The time constant of this charging circuit is preferably short enough for the condenser to become fully charged during the pulses of the multivibrator whereby the charge on the condenser 53 will have substantially the same amplitude as the pulse. At the terminations of the pulses from the multivibrator 50, the condenser 53 will discharge through the resistor 51. The capacitance of the condenser 53 and the resistance of the resistor 51 are sufficiently large to produce a time constant longer than the period between the successive pulses from the multivibrator 50. As a consequence, the extent to which the condenser 53 may discharge will be a function of the time interval between the pulses from the multivibrator 50. The condenser 53 and resistor 51 may be considered as a reactance divider. As the frequency goes up, the reactance of the condenser will decrease and the drop across the resistor 51 will increase. Thus, the voltage across the resistor 51 will be a function of the frequency of the pulses.

Since the voltmeter 54 will be effective to indicate the amplitude of the voltage across the resistor 51, the voltmeter 54 may be calibrated to indicate the frequency or pulse rate of the EKG signal. Preferably, the voltmeter 54 and the circuitry associated therewith have a relatively long time constant so that the meter 54 will produce a reading proportional to the average of the pulse rate. The interval over which the averaging occurs may be of several seconds duration, for example 5 or 10 seconds. As a result, even if the pulse rate is erratic and irregular, the reading on the voltmeter will be relatively steady or vary at a slow rate but will continuously indicate the average of the pulse rate during the preceding interval of 5 or 10 seconds.

The ectopic beat section 38 of the computer 12 may be provided for detecting and indicating the occurrence of premature ventricular contractions producing ectopic beats wherein the configuration of the R wave is materially different from the normal configuration. This section is shown in block form in FIGURE 3 and waveforms present in various portions thereof are shown in the second column of FIGURE 4. The input to this section 38 includes a combination filter-amplifier 70. Since this filter-amplifier 70 is in effect connected directly to the output of the frequency demodulator 28, the signal supplied thereto will be the electrocardiac or EKG signal. An EKG signal from a normal healthy heart will be similar to the first waveform in line A of FIGURE 4, and, as previously described, will include a P wave followed by a QRS complex and a T wave.

In a normal EKG signal the QRS complex will begin with a small negative Q wave of short duration and will terminate in a small negative S wave of short duration. In between these negative waves the R wave occurs. This is a positive pulse having an amplitude that is larger than the remaining waves in the EKG signal. Although the time duration of the R wave varies over a considerable range in a normal or healthy heart, it apparently has a maximum time duration on the order of about 0.04 second.

In the event of a premature ventricular contraction, the EKG signal may include an ectopic beat similar to the second waveform in line A of FIGURE 4 similar to the third waveform in line A of FIGURE 4. In both forms of ectopic beats, the QRS complex and particularly the configuration of the R wave therein are greatly altered from the normal configuration of the R wave. More particularly, in the form of ectopic beat as illustrated by the second waveform in line A, the R wave is a positive pulse, but the time duration thereof is much longer than the normal R wave. Although the time duration of such an R wave may vary over an extended range, it is believed that the time duration is on the order of at least 0.06 second.

In the form of ectopic beat illustrated by the third waveform in line A, not only is the time duration of the R wave increased as described above but, more importantly, it is of negative polarity.

The filter-amplifier 70 forming the input to the section 38 may be of essentially standard or conventional design so as to be effective to increase the amplitude of the EKG sigal passing therethrough to a more useful level. However, since the R wave is the portion that is of primary interest, the amplifier may include means for removing the P, Q, S and T waves and any spurious noises present in the signals. Although this may be accomplished by any suitable means, it has been found that a bandpass filter having a pass band that includes the frequencies of the R wave will be effective for suppressing such waves and particularly the P and T waves. By way of example, the pass band may extend from about 8 cycles per second to about 60 cycles per second.

Such a filter amplifier arrangement will not suppress or materially alter the R wave but will substantially eliminate the P, Q, S and T waves. The waveforms from the output from the filter-amplifier 70, i.e., at point "B," are shown in line B of FIGURE 4. In the event the EKG signal under consideration is of the normal variety, such as typified by the first example in line A, the output signal will be similar to the first waveform in line B. This signal will consist of a positive pulse closely resembling the original R wave and having approximately the same time duration.

In the event the input EKG signal is of a variety similar to the second example in line A, the output signal from the filter-amplifier 70 will be a positive pulse similar to the second example in line B. This pulse will also be substantially coincident with the original R wave and will have substantially the same time duration and, finally, if the input signal is of a variety similar to the third waveform in line A, the output from the filter-amplifier 70 will be a negative pulse similar to the third waveform in line B.

The output of the filter-amplifier 70 is connected to two separate branches 72 and 74. The first branch 72 is effective to detect the occurrence of ectopic beats similar to the second examples in line A while the second branch 74 is effective to detect the occurrence of ectopic beats similar to the third example in line A.

The first branch 72 includes means that are responsive to the amplitude of the signal of the input thereof so as to provide a pulse shaping action. For example, this circuit may be a Schmitt trigger circuit 76. This circuit 76 is preferably set so that it will be in a first or low state with the voltage present on the output of the circuit, i.e., point "C" will normally be low or at ground level when the voltage at the input of point "B" is less than some predetermined amount. However, whenever the amplitude of the signal at the input or point "B" exceeds the predetermined amount, the trigger circuit 76 will switch to a second or high state and will remain switched as long as the potential at the input is above the predetermined amount. As a result, the voltage on the output from the trigger circuit 76 will be essentially a square-wave having short rise and fall times and a time duration corresponding to the length of time the potential at input or point "B" is above a fixed level.

In the present instance, this triggering circuit 76 is set to switch states whenever the potential at point "B" or at the input thereof is above a maximum level on the order of about one-half of the normal peak voltage of the R wave. This is substantially above the level reached by the P and T waves. Only when the R wave is starting, the potential at point "B" will rise through the trigger level and therebeyond and the trigger circuit 76 will switch states substantially coincident with the commencement of the R wave. In addition, when the R wave is ending, the potential at point "B" will fall back through the trigger level and cause the trigger circuit 76 to return to its original state.

As a consequence the potential at the output or point "C" will be a square wave having a time duration substantially equal to the time duration of the R wave. More particularly, in the event of a normal QRS complex such as in the first examples in lines A and B of FIGURE 4, the potential at the output of the trigger circuit 76 or point "C" will correspond to the first example in line C and include a squarewave pulse having a maximum time duration on the order of about 0.04 second or less. However, in the event of the occurrence of a positive ectopic pulse such as in the second examples in lines A and B, the output from the trigger circuit 76 will be a square wave corresponding to the second example in line C and will have a minimum time duration on the order of 0.06 second or longer. In the event of a negative type of ectopic beat corresponding to the third example in line A, the signal at point "B" will never rise to a sufficiently positive level to cause the trigger circuit 76 to switch. As a result, the circuit 76 will not change its state and the first branch 72 will never respond to such negative beats.

The output of the trigger circuit 76 is interconnected with a differentiating circuit 78 that is responsive to the rate of change of the output signal or the potential at point "C." In the present instance this differentiating circuit 78 includes a condenser 80 that is connected in series with the output, and a resistor 82 that is connected to ground. As a result, when the trigger circuit 76 switches from the low state to a higher state there will be a positive pulse of short duration across the resistor 82 and when the trigger circuit switches from the high state to the low state, a negative pulse will appear across the resistor 82.

More particularly, the waveforms appearing across the resistor or at point "D" are shown in line D of FIGURE 4 and consist of a positive pulse corresponding to the beginning of the R wave followed by a negative pulse corresponding to the termination of the R wave. Although the timing between these pulses may vary over a substantially wide range, it is believed that if the EKG signal is normal, such as in the first example of line A, they will normally be less than about 0.04 second apart. In the event of a positive ectopic beat such as the second example in line A, it is believed that the time interval between the pulses will be on the order of at least 0.06 second. In the event of a negative ectopic beat there will be no pulses at point "D," since the trigger circuit will not switch states.

The output from the differentiating circuit 78 or at point "D" may be interconnected with circuit means suitable for determining whether or not the time delay existing between the two pulses is greater than a preselected amount. Although there is a large variety of means suitable for accomplishing this objective, in the present instance a gating network 84 is employed. One of the inputs to this network 84 includes a pulse generator 86 of any conventional well-known variety for generating a squarewave signal in response to a signal on the input. For example, a one-shot multivibrator circuit 86 may be employed that will be responsive to only positive pulses. Upon the occurrence of such a pulse at the input, the circuit 86 will produce a squarewave pulse in the output that will be of some predetermined fixed time duration.

As has been pointed out above, it is believed that the maximum time duration of the pulses at point "C" and the separation of the pulses at point "D" resulting from the occurrence of a QRS complex produced by a normal heartbeat will be on the order of 0.04 second or substantially less than 0.05 second. However, the corresponding times for pulses resulting from an abnormal or ectopic beat will be on the order of at least 0.06 second or substantially greater than 0.05 second. Accordingly, the time contants of the pulse generator circuit 86 are chosen such that the square wave at the output or point "D" will have a time duration that will be between the maximum normal time duration and the minimum time duration. By way of example, it is believed that a pulse duration of 0.05 second will be suitable.

The other input to the network 84 includes an inverter 88 that is connected to the differentiating circuit 78 by means of a diode 90. This diode 90 has the cathode thereof connected to the differentiating circuit 80 so that only negative pulses corresponding to the termination of the R wave will pass therethrough. The inverter 88 will then be effective to invert the polarity of the negative pulse so that the signal on the output or at point "E" will be a positive pulse substantially coincident with the negative pulse.

A conventional "AND" gate 92 may be provided that has one input 94 thereof connected to the point "E" or the output of the inverter 88 and the other input 96 connected to the point "F" or the output of the pulse generator 86. This "AND" gate 92 may be of any well-known construction and will be effective to block the passages of all pulses on either input 94 or 96 unless there is a positive pulse simultaneouly present on both of the inputs 94 and 96. As a result, it may be seen that the positive pulse from the pulse generator 86, and in and of itself may not pass through this gate 92 and, in addition, the positive pulse from the inverter in and of itself will not be capable of passing through the gate 92. However, in the event that a positive pulse from the inverter 88 occurs during the interval while the output pulse from the pulse generator 86 is still present on the second input 96 to the "AND" gate 92, an output pulse will be provided at the output from the "AND" gate 92 (point "G") corresponding to the positive pulse from the inverter 88.

Since the duration of the pulse from the generator 86 is on the order of 0.05 second duration, an output from the "AND" gate 92 will indicate that the R wave was of less than 0.05 second duration. Thus, a pulse at point "G" as shown in the first example of line G of FIGURE 4 indicates a normal heartbeat. Accordingly, a neon bulb, a counter 98 or other suitable indicating means may be interconnected with the output of the "AND" gate 92 so as to visually indicate that a normal pulse has occurred.

In addition, a conventional "NOT" gate 100 may be provided that has one input 102 thereof connected to the output of the inverter 88 (point "E") and the other input 104 connected to the pulse generator 86 (point "F"). This "NOT" gate 100 may be of conventional and well-known design and will be effective to prevent a pulse on the input 102 passing therethrough in the event there is a positive pulse on the second input 104. Thus, the occurrence of a positive pulse from the pulse generator 86 in and of itself will not produce a pulse at point "H" or the output of the "NOT" gate. However, the positive pulse from the inverter 88 in and of itself will not produce a pulse at point "H" provided the positive pulse from the pulse generator 86 is not simultaneously present on the second input 104.

Since the pulse from the generator 86 lasts for a period of 0.05 second, the occurrence of a pulse on the input 102 when there is no pulse on input 104 will indicate that the two pulses have occurred at a greater interval than 0.05 second. This in turn indicates that an ectopic beat has occurred. Accordingly, a pulse at the output from the "NOT" circuit 100 may be interconnected with an input to a multivibrator 105 that is effective to provide a suitable pulse to a counter 106 or other visual means for indicating the occurrence of ectopic beats.

The second branch 74, as previously stated, is for detecting the occurrence of ectopic beats of the variety typified by the third example in line A of FIGURE 4. The input to this branch 74 includes a diode 108 that is interconnected with the output of the filter-amplifier 70 (point "B"). The cathode of the diode 108 is connected directly to the filter-amplifier 70 output so as to be effective to prevent any positive pulses passing therethrough. Thus, pulses such as in the first and second examples in line B of FIGURE 4, which occur as a result of positive R waves, may enter the first branch 72 but will be effectively blocked from entering the second branch 74. However, negative pulses such as in the third example in line B resulting from ectopic beats having negative R waves may pass through the diode 108 and on into the second branch 74. The diode 108 has the plate thereof connected to the input of an inverter 110. The inverter 110 which may be of conventional design will be effective to invert the pulse and to provide a pulse of positive polarity at the output thereof or at point "I." The output of the inverter 110 is, in turn, interconnected with the input to the multivibrator or pulse shaper 105. Since the output from the multivibrator 105 is interconnected with the input to the ectopic beat counter 106, each time a negative R wave occurs the second branch 74 will be effective to pass a pulse to the counter 106 and the occurrence of an ectopic beat will be recorded.

The operation of the section 38 of the computer 12 for processing EKG signals and detecting the occurrence of ectopic beats may be summarized briefly as follows. The input to the filter-amplifier 70 will be interconnected with the output of the demodulator 28 so as to receive the EKG signals therefrom. These EKG signals will thus be fed into the input of the filter-amplifier 70. This will not only increase the amplitude thereof to a more useful level but will also suppress the P, Q, S and T waves and leave substantially only the R wave. If the input signal is an EKG signal resulting from a normal healthy heart, it will have a shape similar to the first example in line A of FIGURE 4, and the output from the amplifier will be a signal similar to the first example in line B. This signal will be a positive pulse having a time duration on the order of 0.03 to 0.04 second and will be fed from the filter-amplifier 70 to the input of both the first and second branches 72 and 74.

Since the diode 108 in the input to the second branch 74 will pass only negative pulses, it will discriminate against the positive R wave signal and, as a consequence, a normal or healthy EKG signal will not produce any effects in the second branch 74 and, as shown in the first example of line I, there will be no signals present in the second branch.

However, the positive pulse will flow into the first branch 72 and the amplitude thereof will increase beyond a sufficient level to cause the Schmitt trigger circuit 76 to switch its state and produce a positive square wave similar to line C that will have a time duration substantially identical to the duration of the R wave. This time duration will normally be on the order of 0.03 to 0.04 second, or substantially less than 0.05 second. This square wave will then be differentiated by the condenser 80 so as to provide a positive pulse and then a negative pulse across the resistor 82 similar to the first example in line D. The positive pulse will be substantially coincident with the commencement of the R wave while the negative pulse will be substantially coincident with the termination of the R wave.

The positive pulse will be blocked by the diode 90 but it will be effective to trigger the pulse generator 86 so as to cause it to fire and produce a square wave similar to line F. The time duration of this square wave pulse will be a predetermined fixed amount and, it is believed, should be on the order of about 0.05 second. This square wave will then be applied to one of the inputs 96 to the "AND" gate 92 and to one of the inputs 104 to the "NOT" gate 100.

The negative pulse signifying termination of the R wave will pass through the diode 90 and the inverter 88 so as to create a positive pulse on the input 94 to the "AND" gate and the input 102 to the "NOT" gate 100. Since the pulse at point "E" will occure within 0.05 second of the positive pulse, it will be conident with the pulse from the generator 86. As a result, a pulse will be passed through the "AND" gate to the counter 98 so as to signify the occurrence of a normal beat. However, since the pulse at input 102 will occur while there is still a pulse present at input 104, there will be no output pulse present from the gate 100 and the counter 106 will not be actuated.

In the event that the EGK signal supplied to the filter-amplifier 70 is of the variety as shown in the second example of line A, a positive pulse similar to the second example in line B will be fed to the Schmitt trigger circuit 76 to thereby create a square wave. This square wave will be differentiated to provide positive and negative pulses across the resistor 82. The positive pulse will trigger the pulse generator 86 to cause a square wave having a time duration on the order of 0.05 second. The negative pulse will pass through the diode 90 and inverter 88 so as to apply a positive pulse to the inputs 94 and 102 to the "AND" and "NOT" gates 92 and 100.

Since the negative pulse at point "D" will be separated from the positive pulse at point "D" by more than 0.05 second, the square wave from the pulse generator 86 will have terminated prior to the occurrence of the positive pulse at point "E." As a consequence, there will be no output from the "AND" gate 92 and the counter 98 will not register any counts. However, since the square wave on the input 104 to the "NOT" gate 100 will have terminated prior to the occurrence of the positive pulse, a pulse will occur in the output of the "NOT" gate 100. This pulse will then be effective to actuate the counter 106 and record the occurrence of an ectopic beat.

In the event that the EKG signal is of the variety typified by the third example in line A, the output signal from the filter-amplifier 70 will be a negative pulse such as shown in the third example of line B. This pulse will be ineffective to actuate the Schmitt trigger circuit 76 and, as may be seen by the third example in lines C through H, inclusive, there will be no signals flowing in the second branch and the counter 98 will not be actuated. However, the negative pulse at point "B" will pass through the diode 108 and inverter 110 where it will be inverted into a positive pulse. This positive pulse will be applied to the multivibrator 105 and cause it to produce a pulse that will be fed to the input of the counter 106 so as to actuate the counter and cause it to record a count indicating the occurrence of an ectopic beat.

The ST segment depression section 40 of the computer 12 may be provided for detecting and indicating the amount of depression of the ST segment of the EKG signal. This section 40 is shown in block form in FIGURE 5 and the waveforms present in various portions thereof are shown in FIGURE 6.

This section 40 includes a first portion 120 that is effective to sample the EKG signal during the ST segment, a second portion 122 that is effective to sample the isoelectric portion of the EKG signal between the P and Q waves preceding the ST segment, and a third portion 124 that is effective to compare the difference between the potentials of the two samples provided by the portions 120 and 122.

The first portion 120 includes an input 126 that may be operatively interconnected with a source of an EKG signal. For example, the input 126 may be connected directly with the output of frequency demodulator 28 so as to receive an EKG signal therefrom substantially identical to the original EKG signal but amplified therefrom. The input 126 is divided into a first branch 128 and a second branch 130. The first branch 128 in the present instance includes an amplifier 132 that has the output thereof connected to a supply line 134 that will carry the EKG signal thereon. The amplifier 132 may be effective to invert the polarity of the EKG signal so that the QRS complex of the signal on the supply line 134 will normally be positive. In the event the EKG signal is received as a positive signal, the inverter 132 may, of course, be eliminated. The EKG signal on the supply line 134 will correspond to the examples in line A of FIGURE 6. As previously stated, the first example is a substantially normal EKG signal and the potential of the isoelectric portion between the P and Q waves will be substantially identical to the potential of the ST segment following the "J" point. The second example of line A corresponds to an abnormal signal having so-called ST segment depression. More particularly, it will be noted that the potential of the ST segment and particularly the portion following the "J" point is substantially more negative than the isoelectric portion between the P and Q waves. The supply line 134 is interconnected with a suitable buffing or isolating means such as a cathode follower 136 so as to supply the EKG signal thereto. This cathode follower 136 will provide a low impedance source for charging the sample capacitors and also be effective to isolate the supply line 134 from subsequent stages so that the EKG signal present on the line 134 will be free from any disturbances or distortions.

The output from the cathode follower 136 is connected to a fixed contact 138 in a three-pole, double-throw switch 140. The movable contact 142 for engaging the fixed contact 138 is connected to one side 144 of a capacitor 146. It may thus be seen that since the EKG signal will be present on the contact 138, by actuating the switch 140 so that the contact 142 engages the contact 138 only during the ST segment, only the potential during this segment will be applied to the side 144 of the condenser 146. Thus, the charge on the side 144 will have a potential equal to the potential of the ST segment.

The second branch 130, which is effective to actuate this switch 140 during the ST segment, includes an amplifier 148 that includes filtering or differentiating means effective to separate the S wave from the EKG signal and to amplify the wave to a more useful level. The output of the amplifier 148 will thus be a negative wave similar to the S wave substantially as shown in line J of FIGURE 6.

The output from the filter-amplifier 148 is, in turn, connected with an input to a Schmitt trigger circuit 150. This circuit 150 is responsive to the amplitude or potential of the signal on the input thereof. In the present instance, this circuit 150 is set such that the potential on the output thereof will normally be zero. However, whenever the potential on the input exceeds a level equal to approximately one-half of the amplitude of the S wave from the filter-amplifier, the circuit will switch its state and the potential of the output will be high. As a consequence, the output signal from the Schmitt trigger circuit 150 will be similar to line K of FIGURE 6. This signal consists of a series of squarewaves or positive pulses substantially coincident with the S waves and of substantially identical duration.

The output from the Schmitt trigger circuit 150 is interconnected with the input to an astable flip-flop or one-shot multivibrator 152. This multivibrator 152 will be effective to normally have a zero potential on the output thereof. However, when an appropriate signal is applied to the input thereof, the multivibrator 152 will change its state for a predetermined period of time and then return to its original state. In the present instance, the multivibrator 152 is effective to switch its state substantially coincident with the trailing edge or the termination of the pulse from the Schmitt trigger circuit 150. As a result, the signal on the output from the multivibrator 152 will correspond to line L of FIGURE 6. More particularly, the signal will include a pulse each time there is a pulse from the Schmitt trigger circuit 150. As a result, the signal on the output from the multivibrator 152 will correspond to line L of FIGURE 6. More particularly, the signal will include a pulse each time there is a pulse from the Schmitt trigger circuit 150. However, these pulses will commence when the pulses from the trigger circuit 150 terminate and, as a consequence, the trailing edge thereof will be displaced from the trailing edge of the S wave by the time duration of the pulse. The duration of this pulse may be on the order of about 0.011 to 0.017 second or such other period of time as will cause it to occur sometime immediately following the "J" point.

The output from the multivibrator 152 is in turn interconnected with a second multivibrator 154. This multivibrator 154 may be similar to the preceding one and is effective to switch its state in response to the trailing edge of the pulse from the multivibrator 152. The output signal from this multivibrator 154 which corresponds to line M of FIGURE 6 will be a series of square waves or pulses. By adjusting the duration of the pulse from the multivibrator 152, the time at which the pulse occurs may be made coincident with any portion of the ST segment and particularly during the portion thereof when it is desired to sample it.

The output of the multivibrator 154 is interconnected with the input to a relay driver 156. The driver 156 energizes a relay coil 157 foar actuating the armature in a relay that operates the switch 140. Normally the movable contact 142 will be retained against the fixed contact 158. Thus, the side 144 of the capacitance will be isolated from the source of the EKG signal. While the pulse from the multivibrator 154 is applied to the driver 156, the coil 157 will be energized and the movable contact 142 will be held against the fixed contact 138 to thereby interconnect the side 144 with the cathode follower 136.

It may thus be seen that once during each EKG cycle, the S wave from the filler-amplifier 148 will cause the Schmitt trigger circuit 150 to produce a pulse that will result in the multivibrators 152 and 154 providing pulses that will be effective to cause the relay driver 156 to momentarily actuate the switch contact 142. By adjusting the durations of the pulses from the multivibrator 152, the closing of the contacts 138 and 142 may be delayed until afted the "J" point so as to insure an occurrence of a suitable portion of the ST segment for sampling. By adjusting the durations of the pulses from the multivibrator 154, the closing of the contacts 138 and 142 will only be long enough to obtain the desired sample. Accordingly, once during each cycle, the side 144 of condenser 146 will have a potential applied thereto that is identical to the EKG signal during the ST segment. As a result, the potential on the side 144 which corresponds to line N of FIGURE 6 will be proportional to the average potential during the ST segment.

The second portion 122 includes an input conductor 160 that is interconnected with the supply line 134 and an output conductor 162 that is effective to supply a signal proportional to the isoelectric portion between the P and Q waves. The occurrence of the isoelectric portion may be sensed by any suitable means. However, as a result of the wide variations in the configurations of the EKG signals and the variations in the rhythm thereof, it has been found that the most effective means for determining the time to sample the isoelectric portion is to correlate the sampling with the commencement of the QRS complex immediately following the termination of the isoelectric period.

In the present instance, this is accomplished by means of a free-running multivibrator 164 set to continuously oscillate at a fixed frequency and having differentiating means to produce a pulse train similar to line B of FIGURE 6. In the present instance, this pulse train consists of a series of negative pulses or "spikes." The interval of time between these pulses may vary through a considerable range but is primarily dependent upon the configuration of the EKG signal. However, it has been found that for most applications, the timing may be on the order of about 0.035 second.

The output from the multivibrator 164 may be interconnected wtih one input 168 to a bistable multivibrator 166 so as to supply the negative pulses thereto. Since this multivibrator 166 is bistable, it will remain in either state until a negative triggering pulse occurs on the input thereof. Thus, the signal on the output 170 from one side of the multivibrator 166 will be a squarewave substantially the same as in line D of FIGURE 6. Since the multivibrator 166 changes states each time a pulse occurs the frequency of the squarewave will be one-half of the frequency of the pulse train from the multivibrator 164. A second output 172 from the opposite side of the multivibrator will also have a squarewave signal thereon similar to line E of FIGURE 6. This squarewave will be of the same frequency as the squarewave in line D but will be 180° out of phase therewith.

The multivibrator 166 may also include a second input 174. When there is no signal present on the input 174, the signals at the input 168 will control the multivibrator 166 and cause it to switch back and forth as described above. However, if a signal is present on input 174, it will be effective to prevent any further switching of the multivibrator 166 even though there are signals present on input 168. Thus, a signal on the input 174 will retain the multivibrator in whichever state it is in at the time that the input signal occurs.

The input 174 is connected to a one-shot multivibrator 176 effective to produce an output pulse of a fixed predetermined time duration each time a signal is applied to the input 178. The input 178 may be interconnected with a source of a signal that will be indicative of the commencement of the QRS complex. By way of example, the input 178 may be connected to point D in FIGURE 3 so as to receive a pulse each time the R wave occurs. Each of these input pulses from point "D" of FIGURE 3 will be effective to cause the multivibrator 176 to switch its state and produce a square wave output pulse such as shown in line C of FIGURE 6. Preferably this pulse will have a time duration that is long enough to extend from the commencement of the QRS complex to the end of the EKG signal, i.e., beyond the T wave. Since this pulse signal will be fed into the multivibrator 166 during the interval beginning with the QRS complex to the end of the EKG signal, the multivibrator 166 will remain fixed in one state and one of the outputs, 170, will remain high while the other output 172 will remain low.

The output 170 may be interconnected with a relay driver 180 that will be effective to energize a relay coil 182 in response to the signal from output 170. The armature of the relay is connected to a movable contact 184 in a switch 186 so as to move the contact 184 between the fixed contacts 188 and 190. The movable contact 184 is connected to one side of a condenser 192 that has the opposite side thereof grounded. The first fixed contact 188 is connected to the memory or output 162 line, while the other fixed contact 190 is connected to a sample line 194.

The output 172 may be interconnected with a second coil driver 195 that will be effective to energize a second relay coil 196 in response to the signal from output 172. The armature for this relay is connected to a movable contact 198 in a switch 200 so as to move the contact 198 between the fixed contacts 204 and 206. The movable contact 198 is connected to one side of a condenser 208 that has the opposite side thereof connected to ground. The fixed contact 206 is connected to the memory or output line 162 while the fixed contact 204 is connected to the sample line 194.

When the potential at the output 170 is high, the relay driver 180 will be effective to energize the coil 182 and move the contact 184 to contact 188 and connect the condenser 192 to the memory line 162. At the same time the potential at output 172 will be low and the contact 198 will be against the contact 204 and connect the condenser 208 to the sample line 194. During the remaining half cycle the potential at the output 170 will be low and the condenser 192 will be connected to the sample line 194 while the potential at output 172 will be high and the condenser 208 will be connected to memory line 162. As a result, one of the condensers will always be connected to the sample line 194, and one of the condensers will always be connected to the memory line 162.

The opposite end of the sample line 194 is connected to a movable contact 210 in the sample switch 212 for intermittently connecting the sample line 194 with the input line 160 to thereby provide periodic samples of the EKG signal on the sample line 194. The opening and closing of the switch 212 is controlled by a branch 213 that extends from the output of the multivibrator 166. More particularly, the branch 213 includes a first diode 214 that is connected to the output 170 and a second diode 216 that is connected to the output 172. Both of the diodes 214 and 216 are connected to the input of a one-shot multivibrator 218 when they are differentiated. As a result, a series of pulses similar to those in line F of FIGURE 6 may be fed into the multivibrator 218. These pulses will correspond to the switching of the multivibrator 166 and will, therefore, have a frequency that is double the frequency thereof.

The output of the multivibrator 218 is interconnected with a differentiating circuit which includes a condenser 220 and a resistor 222. As a consequence, the voltage present across the resistor 222 will be a series of pulses similar to the pulses of line G.

The resistor 222 may be connected to the input of a multivibrator 224 so that the multivibrator 224 will be actuated by positive pulses similar to those in line H of FIGURE 6. The multivibrator 224 will be effective to produce a square wave pulse of fixed duration each time there is a pulse on the input. The output from the multivibrator 224 will thus correspond to line I of FIGURE 6.

It may thus be seen that the pulses of line I from the multivibrator 224 will commence substantially coincident with the trailing edges of the pulses in line G from the multivibrator 218. Thus, the pulses from the multivibrator 224 will be delayed from the actuation of the switches 186 and 200 by the duration of the pulses from the multivibrator 218.

The output of the multivibrator 224 is connected to a relay driver 226 which will be effective to energize the coil 228. The coil 228 when energized will be effective to actuate its armature so as to move the movable contact 210 in the sample switch 212 against the fixed contact. The closing of these contacts will be effective to interconnect the sample line 194 with the supply line 134. Thus, samples of the EKG signal will be periodically supplied to the contacts 190 and 204.

It will thus be seen that in the absence of a disabling signal from the multivibrator 176, the free-running multivibrator 164 will be effective to cause the bistable multivibrator 166 to alternately energize and de-energize the relay drivers 180 and 195 and actuate the switches 186 and 200 in synchronism but 180° out of phase with each other. This will alternately interconnect first the condenser 192 with the sample line 194 and the condenser 208 with the memory line 162 and, secondly, the condenser 208 with the sample line 194 and the condenser 192 with the memory line 162. The frequency of this switching action will be controlled by the frequency of the multivibrator 164. Although the interval between the pulses from the multivibrator 164 may be in a wide range for most EKG signals, the interval may be in a range on the order of 0.035 to 0.04 second. More particularly, the time interval is preferably at least as short as the isoelectric portion between the P and Q waves but sufficiently long to permit proper sampling of the EKG signal and charging of condensers 192 and 208.

Following the foregoing switching by a period corresponding to the duration of the pulse from the multivibrator 218, the sampling switch 212 will close and connect the contacts 190 and 204 with the supply line 134. It may thus be seen that one of the condensers 198 or 208 will be connected to the supply line 134 so as to acquire a charge having a potential corresponding to the potential during the sampling period when the switch 218 is closed. The other condenser 192 or 208 will be connected to the memory line 194 and will have a charge thereon with a potential corresponding to the potential of the EKG signal during the preceding sampling period when the switch 218 was closed. It may thus be seen that at any given instance, the charge applied to the memory line 162 will have a potential corresponding to the potential the EKG had approximately 0.035 second previously, i.e., the interval between the pulses from the multivibrator 164B, FIGURE 6.

Substantially coincident with the commencement of the QRS complex, a pulse on the input 178 will cause the one-shot multivibrator 176 to produce a pulse corresponding to line C of FIGURE 6. This pulse will exist from the beginning of the QRS complex to the end of the EKG cycle and will be effective to disable the multivibrator 166. This, in turn, will cause the switches 186 and 200 to remain stationary. Accordingly, during this interval, one of the condensers 192 or 208 will be connected to the memory line 162. Since the charge on the condenser was acquired approximately on the order of 0.035 second before the disabling of the multivibrator 166, the potential thereof will correspond to the potential of the isoelectric portion between the P and Q waves.

In order to supply this isoelectric signal to the third portion 124, the memory line 162 is connected to a fixed contact 230 in the switch 140. A movable contact 232 is provided which is effective to engage the fixed contact 230 and is electrically connected to the input of a cathode follower 234. The output of the cathode follower 234 is, in turn, interconnected with a fixed contact 236. A movable contact 238 engages this contact so as to interconnect the output of the cathode follower 234 with the side 240 of the condenser 146. It will thus be seen that in the interval following the "J" point when the switch 140 is actuated by the relay driver 156, the side 240 of the condenser 146 will acquire a charge having a potential corresponding to the isoelectric portion between the P and Q waves. During the remaining portion of the cycle, the movable contact 238 will be against the fixed contact 242. Thus, the side 240 of condenser 146 will be effective to maintain the contact 242 at the isoelectric potential.

The third portion 124 includes a pair of conductors 244 and 246. The first conductor 244 has one end thereof connected to the fixed contact 158 and the other end connected to a cathode follower 248. Thus the potential on the side 144 of the condenser 146 will be supplied to the cathode follower 248 and therefore the potential at the output of the follower will correspond to the potential of the ST segment. The second conductor 246 has one end connected to the contact 242 and the other end connected to the input of a cathode follower 250. Thus the potential on the side 240 of the condenser 146 will be applied to the input of the follower and therefore the potential of the isoelectric portion. The outputs from the two cathode followers 248 and 250 may be interconnected with any suitable indicating means such as a paper tape recorder or a vacuum tube voltmeter 252.

It may thus be seen that when the switch 140 is in the position shown, the potential on the side 144 of the condenser 146, which corresponds to the potential during the ST segment, will be fed through the follower 248 to one side of the vacuum tube voltmeter. At the same time the potential on the side 240 of the condenser 146 which corresponds to the potential of the isoelectric portion between the P and Q waves will be fed through the follower 250 to the other side of the vacuum tube voltmeter 252. Thus, the voltmeter 252 will be effective to indicate the difference between these two potentials or the difference between the ST segment and the isoelectric portion.

It may thus be seen that if the section 40 of the computer 12 is employed to process EKG signals and to indicate the amount of depression or elevation of the ST segment relative to the isoelectric portion between the P and Q waves, the input 126 may be interconnected with the frequency demodulator 28 so as to receive the EKG signal therefrom. This EKG signal will pass through the inverter 132 where it will be amplified and fed to the conductor 134. This signal will then be simultaneously supplied to the sampling switch 212 and the cathode follower 136. At the same time, the free-running multivibrator 164 will be producing a series of pulses corresponding to line B of FIGURE 6. These pulses will be effective to trigger the bistable multivibrator 166 such that the outputs 170 and 172 will have squarewave signals similar to those of lines D and E. These squarewave signals will be effective to actuate the relay drivers 180 and 195 so as to alternately move the contacts 184 and 198 of switches 186 and 200 between the memory line 162 and the sample line 194.

The actuation of switches 186 and 200 will be effective to alternately interconnect the condensers 192 and 208 with the memory line 162 and the sample line 194. Following the actuation of the switches 186 and 200 by a time interval equal to the duration of the pulse from the multivibrator 218, the multivibrator 224 will excite the relay driver 226 so as to close the sampling switch 212. This switch will remain closed long enough for the condenser 192 or 208 connected to the sample line 194 to acquire a charge having a potential equal to the potential of the EKG signal during the sample period.

The actuation of the switches 186 and 200 will continue until a pulse indicating the commencement of the R wave is applied to the input 178 of the one-shot multivibrator 176. This multivibrator will produce a square-wave on its output similar to line C, commencing substantially coincident with the R wave and continuing until subsequent to the T wave. When this pulse exists, it will block the bistable multivibrator 166. As a consequence, during this interval, the actuation of switches 186 and 200 will cease and one of the condensers 192 or 208 will be connected to the sample line 194 while the other condenser will remain connected to the memory line 162.

The condenser connected to the sampling line 194 will have a charge with a potential equal to the potential of the EKG signal at the time the R wave commences. However, the other condenser which will be connected to the memory line will have a charge thereon with a potential corresponding to the potential of the EKG signal during the preceding sample interval. This sample interval will precede the commencement of the R wave and will supply a potential to the memory line 162 proportional to the potential of the isoelectric reference portion.

In addition, the EKG signal will be supplied to the amplifier 148 so as to produce a pulse at point J corresponding to the S wave. This pulse will be effective to actuate the Schmitt trigger circuit 150, the one-shot multivibrator 154, and the relay driver 156 so as to actuate the switch 140. As may be seen from the waveforms present in lines J, K, L and M of FIGURE 6, the delays produced by the Schmitt trigger 150 and one-shot multivibrator will be effective to cause the switch 140 to be actuated during the ST segment sometime following the occurrence of the J point.

When the switch 140 is actuated, the contact 232 will be moved against the contact 230 so as to cause the isoelectric reference potential on memory line 162 to be fed to the cathode follower 234, to the contacts 236 and 238 and to the side 240 of the condenser 146. At the same time, the EKG signal on the line 134 will pass through the cathode follower 136 and contacts 138 and 142 so as to apply the potential of the EKG signal on the line 134 will pass through the cathode follower 136 and contacts 138 and 142 so as to apply the potential of the EKG signal during the ST segment to the side 144 of the condenser 146. It will thus be seen that the potential difference between the charges on the opposite sides 144 and 240 of the condenser 146 will correspond to the difference between the isoelectric reference portion and the ST segment. After the termination of the pulse from the multivibrator, the switch 140 will return to the position shown in FIGURE 5 so as to connect the opposite sides of the condenser 146 with the cathode followers 248 and 250. As a consequence, the potentials of the charges on the opposite sides of the condenser will be fed to the meter 252. Thus, the meter 252 will be effective to indicate the difference between these potentials.

In the event the EKG signal is substantially normal, the difference between the charges on the condenser 146 will be substantially zero as shown in the first example of line N of FIGURE 6. Under these circumstances, the meter 252 will indicate zero or no ST segment depression. However, in the event the EKG is not normal, i.e., has ST segment depression, the EKG signal will correspond to the second example in line A of FIGURE 6 and the potential difference across the condenser 146 will correspond to the second example in line N. Under these circumstances, the meter will be effective to indicate the amount of the ST depression.

It may thus be seen that means have been provided for processing large volumes of electrocardiac signals automatically with little or no human assistance. Although only a single embodiment has been illustrated it will be readily apparent to persons skilled in the art that numerous changes and modifications may be made thereto without departing from the invention. For example if desired means may be included with the various indicating meters for producing a permanent record such as an ink line on a paper tape. Also the various time constants and other characteristics of the system may be modified whereby the tape may be played back at an accelerated rate and the EKG may be processed in a much shorter interval of time. Accordingly, the foregoing disclosure is for illustrative purposes only and does not limit the invention which is defined only by the claims that follow.

I claim:
1. In a device of the class described for receiving electrocardiac signals wherein said signals will normally have a QRS complex preceded by a reference portion and followed by an ST segment, the combination of:
pickup means for receiving the electrocardiac signal, first sampling means interconnected with said pickup means and effective to sample said electrocardiac signal during said reference portion to provide a first sample signal corresponding to the potential of said electrocardiac signal during said reference portion,
second sampling means interconnected with said pickup means and effective to sample said electrocardiac signal during said ST segment to provide a second sample signal corresponding to the potential of said electrocardiac signal during said ST segment, and
means operatively interconnected with said first and second sampling means, said last means being responsive to said first and second sample signals for comparing said signals and indicating the difference therebetween.

2. In a device of the class described for receiving electrocardiac signals wherein said signals normally have a QRS complex preceded within a predetermined time interval by an isoelectric reference portion and followed by an ST segment, the combination of:
pickup means for receiving said electrocardiac signals, first sampling means interconnected with said pickup means and effective to periodically sample the potential of said signal for intervals that are shorter than the duration of said isoelectric reference portion to provide a series of reference sample signals, said first sample means being effective to retain the sample obtained during said reference portion,
timing means interconnected with the pickup means and the first sampling means, said timing means being responsive to the QRS complex and effective to cause said sampling means to retain the sample signal obtained within said predetermined time interval, second sampling means effective to sample the potentials of said signal during said ST segment and provide an ST sample signal, and
means operatively interconnected with said first and second sampling means for comparing said retained sample signal and the ST sample signal and indicating the difference therebetween.

3. In a device of the class described for receiving electrocardiac signals wherein said electrocardiac signals normally have a reference portion and an ST segment, the combination of:
pickup means for receiving said electrocardiac signals, first sampling means interconnected with said pickup means and effective to periodically sample the potential of said electrocardiac signal at intervals that are shorter than said reference portion to provide a sample signal,
storage means interconnected with said first sampling means and effective to disable said first sampling means from further sampling so as to retain the sample signal made during the reference portion, second sampling means interconnected with said pickup means and effective to sample said electrocardiac signal during the ST segment to provide a second sample signal, and means interconnected with said first and second sampling means for comparing said retained samples to thereby indicate the difference between the potentials of said electrocardiac signal during said ST segment and said reference portion.

4. In a device of the class described for receiving electrocardiac signals wherein said electrocardiac signals include a reference portion and an ST segment, the combination of:

a pickup for receiving the electrocardiac signals, sampling means interconnected with said pickup and effective to periodically sample said electrocardiac signal at intervals that are shorter than the duration of said reference portion, storage means interconnected with the sampling means for retaining at least one of said samples, means interconnected with the sampling and storage means and effective to disable said first means from further sampling and cause said storage means to retain a sample corresponding to the reference portion, and means for comparing the potential of said stored sample with the potential of said electrocardiac signal during said ST segment.

5. In a device of the class described for receiving electrocardiac signals wherein said electrocardiac signals include a QRS complex preceded by a reference portion and followed by an ST segment, the combination of:

a pickup for receiving the electrocardiac signals, sampling means interconnected with the pickup for periodically sampling said electrocardiac signals for intervals that are at least as short as the duration of said reference portion, timing means interconnected with the pickup and responsive to the occurrence of said QRS complex, said timing means being connected to the sampling means and effective to disable said sampling means from further sampling and to cause a sample corresponding to said reference portion to be stored, and means for comparing said stored samples with said electrocardiac signal during said ST segment.

6. In a device of the class described for receiving electrocardiac signals wherein said electrocardiac signals include a QRS complex preceded by a reference portion and followed by an ST segment, the combination of:

a pickup for receiving the electrocardiac signals, means interconnected with said pickup for periodically sampling said electrocardiac signals for intervals that are at least as short as the duration of said reference portion, storage means interconnected with said first means for storing said samples for predetermined intervals of time, means responsive to the occurrence of said QRS complex and effective to disable said sampling means to thereby cause said storage means to retain a sample corresponding to said reference portion, and means for comparing said retained sample with said electrocardiac signal during said ST segment.

7. In a device of the class described for receiving an electrocardiac signal wherein said electrocardiac signal includes a QRS complex preceded by a reference portion and followed by an ST segment, the combination of:

a pickup for receiving the electrocardiac signals, means interconnected with said pickup and including at least one capacitance, means effective to periodically interconnect the capacitance with the pickup to sample said signal for causing said capacitance to store a series of charges having potentials corresponding to the potential of said signal during successive sampling periods, means responsive to the occurrence of said QRS complex and effective to disable said first means and cause said capacitance to retain the charge obtained during said reference portion, and means for comparing the potential of said ST segment with the potential of said retained charge on said capacitance.

8. In a device of the class described for receiving an electrocardiac signal wherein said electrocardiac signal normally includes a P wave, a QRS complex and an ST segment, the combination of:

a capacitance for storing a charge thereon, means for periodically operatively interconnecting said capacitance with said source for periods at least as short as the interval between said P wave and said QRS complex such that said capacitance will retain a charge proportional to said electrocardiac signal during a sample period, means responsive to the occurrence of said QRS complex and effective to disable said first means such that said capacitance will retain a charge thereon corresponding to the interval between said P wave and said QRS complex, and means for comparing the ST segment of said signal following said QRS complex with the charge stored on said capacitance.

9. In a device of the class described for receiving an electrocardiac signal wherein said electrocardiac signal normally includes a P wave, a QRS complex and an ST segment, the combination of:

means for periodically sampling said electrocardiac signal, said means including at least one capacitance for storing a charge having a potential proportional to the potential of said signal during one of said samples, means responsive to said QRS complex and effective to disable said first means and to cause said capacitance to hold said charge thereon, a second capacitance, means for periodically operatively interconnecting one side of said second capacitance with said source during said ST segments and for periodically operatively interconnecting the opposite side of said second capacitance with said first capacitance, and means for indicating the difference between the potentials on the opposite sides of said second capacitance.

10. In a device of the class described for receiving an electrocardiac signal wherein said electrocardiac signal normally includes a P wave, a QRS complex and an ST segment, the combination of:

a pair of capacitances, means for alternately interconnecting said capacitances with said source for periodically sampling said electrocardiac signal for periods that are at least as short as the interval between said P wave and said QRS complex, means responsive to said QRS complex and effective to disable said first means and to cause at least one of said capacitances to retain a charge having a potential corresponding to the potential of said EKG signal during said interval, means for periodically sampling said electrocardiac signal during said ST segment, said means including at least one capacitance for storing a charge with a potential on one side proportional to the potential of said sample during said ST segment and a potential on the other side proportional to the potential of said retained charge, and means for indicating the potential difference across said last capacitance.

11. In a device of the class described for processing an electrocardiac signal having a P wave, a QRS complex and an ST segment, the combination of:
- means for periodically sampling the potential of said electrocardiac signal,
- storage means operatively interconnected with said first means and effective for retaining the last two samples,
- means responsive to the occurrence of said QRS complex and effective to disable said first means to retain the last pair of samples in said sotrage means, and
- means for comparing the penultimate sample with said electrocardiac signal during said ST segment.

12. In a device of the class described for processing an electrocardiac signal having a P wave, a QRS complex and an ST segment, the combination of:
- means for periodically sampling said electrocardiac signal at intervals shorter than the interval between the end of said P wave and said QRS complex and for storing at least the last two of said samples,
- means operatively interconnected with said first means and responsive to the beginning of said QRS complex and effective to disable said first means and to retain at least the penultimate sample,
- means responsive to the ending of said QRS complex for sampling said electrocardiac signal during a predetermined interval after said ending, and
- means for comparing the penultimate retained sample with said sample following said QRS complex.

13. In a device of the class described for processing an electrocardiac signal having a P wave, a QRS complex and an ST segment, the combination of:
- sampling means for periodically sampling said electrocardiac signal at intervals shorter than the interval between the end of said P wave and said QRS complex and for retaining at least the last two of said samples,
- means interconnected with said first means and responsive to said QRS complex and effective to disable said first means and to retain at least the penultimate sample,
- second sample means responsive to the termination of said QRS complex and effective to sample said electrocardiac signal in a predetermined interval thereafter,
- a capacitance, and
- means for interconnecting said capacitance with said sampling means to acquire a charge having a potential on one side corresponding to the potential of the penultimate of said retained samples and a potential on the other side corresponding to the potential of the sample following said QRS complex.

14. In a device of the class described for receiving an electrocardiac signal wherein said signal includes a P wave, a QRS complex and an ST segment, the combination of:
- first sampling means for being operatively interconnected with said source to periodically sample said electrocardiac signal at intervals that are at least as short as the interval between the end of said P wave and the beginning of said QRS complex, said means including a pair of condensers for alternately storing charges having potentials proportional to the potential of said signal during said sampling intervals,
- means interconnected with said first means and responsive to said QRS complex and effective to disable said means so that one of said condensers will retain a charge corresponding to the penultimate sample,
- second sampling means responsive to the termination of said QRS complex for sampling said signal during said ST segment,
- a capacitance, and
- means for interconnecting one side of said last capacitance with said first sampling means and the other side with said second sampling means.

15. Means for indicating the rate at which electrocardiac signals are occurring wherein said electrocardiac signals include a portion that has an amplitude greater than the remaining portions of said signal, said means comprising the combination of:
- pickup means for receiving the electrocardiac signals,
- second means interconnected with the pickup means and responsive to said portion having the greater amplitude in said signal, the second means being effective to provide a pulse having a predetermined amplitude, and
- third means operatively interconnected with said second means and responsive to said pulse for indicating the rate at which said pulses are occurring, the third means having a time constant that is long compared to the periods of the electrocardiac signals.

16. In a device of the class described for receiving electrocardiac signals wherein said signals include P, Q, R, S and T waves for indicating the rate at which said signals occur, the combination of:
- pickup means for receiving the electrocardiac signals,
- filter means interconnected with said pickup means and effective to suppress said P, Q, S and T waves and to leave substantially only said R wave,
- means operatively interconnected with said filter means and responsive to the occurrence of said R waves to provide an output signal having a predetermined amplitude each time an R wave occurs,
- a condenser operatively interconnected with the last means for accumulating a charge having an amplitude substantially equal to the amplitude of said output signal each time an output signal occurs, a resistor interconnected with said condenser and effective to let said charge dissipate at a predetermined rate, said condenser and resistor having a long time constant compared to the period of said electrocardiac signals, and
- meter means operatively interconnected with said resistor for indicating the rate at which the charge present on the condenser is discharging.

17. In a device of the class described for receiving electrocardiac signals wherein each signal has a plurality of portions that are below a predetermined level and an R wave that is above the level, the combination of:
- pickup means for receiving said electrocardiac signals,
- signal means connected to said pickup means and responsive to the amplitude of said signal, said signal means being effective to generate a first pulse substantially coincident with the instant the amplitude of said R wave increases above said level and to generate a second pulse substantially coincident with the instant the amplitude of said R wave decreases below said level,
- timing means interconnected with said signal means and responsive to said first and second pulses, said timing means being effective to provide an output signal only when the time interval between said pulses is greater than a predetermined amount, and
- indicating means interconnected with the timing means and responsive to said output to provide an indication only when an output signal occurs.

18. In a device of the class described for receiving electrocardiac signals wherein each of said signals include a plurality of different portions and an R wave with an amplitude greater than a predetermined level that is greater than the remaining portions, the combination of:
- pickup means for receiving said electrocardiac signals,
- pulse means interconnected with said pickup means and being responsive to the amplitude of said signal, said means being effective to generate a duration pulse only during the interval the amplitude of said signal increases beyond the predetermined level,
- timing means interconnected with the pulse means and responsive to the beginning of the duration pulses, said timing means being effective to produce a time pulse that persists for a predetermined interval from the beginning of the duration pulse, and means interconnected with said pulse means and said timing means, said last means being responsive to the time pulse and to the duration pulse, said last means being effective to indicate whenever said duration pulse persists longer than the time pulse.

19. In a device of the class described for processing electrocardiac signals wherein each of said electrocardiac signals normally has P, Q, R, S and T waves, the combination of:
pickup means for receiving said electrocardiac signals,
filter means interconnected with said pickup means and effective to suppress said P, Q, S and T waves and leave substantially only said R wave,
pulse means interconnected with said filter means and responsive to the output from said filter means for producing a first pulse substantially coincident with the commencement of said R wave and a second pulse substantially coincident with the termination of said R wave, and
means interconnected with said pulse means and effective to indicate when the time interval between said first and second pulses is in excess of some predetermined amount.

20. In a device of the class described for processing electrocardiac signals wherein each of said electrocardiac signals normally has P, Q, R, S and T waves, the combination of:
a pickup for receiving the electrocardiac signals,
a filter interconnected with said pickup and effective to suppress said P, Q, S, and T waves and pass a filtered signal substantially identical to said R wave,
pulse means interconnected with said filter and responsive to the amplitude of the filtered signal for producing a pulse having a time duration that is substantially equal to the duration of said R wave,
polarity means interconnected with said pickup means and responsive to the polarity of the R wave to produce a polarity signal each time the R wave is inverted, and
indicator means interconnected with the pulse means and responsive to the duration of said pulse to indicate when the time duration of said pulse is in excess of some predetermined amount and interconnected with the polarity means and responsive to the polarity signal to indicate when the polarity of the R wave is inverted.

21. In a device of the class described for receiving electrocardiac signals wherein each signal normally has a QRS complex preceded within a predetermined time interval by an isoelectric reference portion and followed by an ST segment, the combination of:
pickup means for receiving said electrocardiac signals,
first sampling means interconnected with said pickup means and effective to periodically sample the electrocardiac signals at intervals that are shorter than said predetermined time interval to provide a series of reference sample signals,
storage means interconnected with said first sample means and effective to store at least the last sample signal from the sampling means, said storage means being effective to retain the stored sample signal for an interval that is at least as long as said predetermined time interval,
timing means interconnected with the pickup means and responsive to the QRS complex, said timing means being interconnected with said sampling means to disable said sampling means when said QRS complex occurs, said timing means being interconnected with said storage means to cause the storage means to retain the stored sample signal obtained within the preceding predetermined time interval,
second sampling means interconnected with said pickup means and effective to sample the electrocardiac signal to provide an ST sample signal,
second timing means interconnected with said second sampling means and responsive to said QRS complex to cause said second sampling means to sample the electrocardiac signal during said ST segment and provide an ST sample signal,
means operatively interconnected with said first and second sampling means for comparing said retained sample signal and the ST sample signal, and
indicating means interconnected with the last means and effective to indicate the difference between the compared signals.

22. In a device of the class described for receiving electrocardiac signals wherein each of the signals normally has a QRS complex preceded within a predetermined time interval by an isoelectric reference portion and followed by an ST segment, the combination of:
pickup means for receiving said electrocardiac signals,
first sampling means interconnected with said pickup means and effective to periodically sample the electrocardiac signals at sample intervals that are shorter than the predetermined time interval to provide a series of reference sample signals,
storage means interconnected with the first sampling means and having a pair of portions, said portions being effective to alternately receive the last sample signal and to store that sample signal for an interval that is substantially as long as the sample interval,
timing means interconnected with the pickup means and the first sampling means, said timing means being responsive to the QRS complex and effective to disable said sampling means and cause the storage means to retain the stored sample signal obtained within the predetermined time interval,
second sampling means interconnected with said pickup means and effective to sample the electrocardiac signal to provide an ST sample signal,
second timing means interconnected with the second sampling and responsive to said QRS complex to cause said sampling to sample the electrocardiac signal during said ST segment and provide an ST sample signal, and
means operatively interconnected with the storage means for receiving the retained sample signal and with the sampling means for receiving the ST sample signal and comparing said signals and indicating the difference therebetween.

23. In a device of the class described for receiving electrocardiac signals, the combination of:
pickup means for receiving said electrocardiac signals;
second means connected to said pickup means and sampling a particular characteristic of said electrocardiac signal recurring at heart beat rate and as received by said pickup means and forming a recurring signal particularly representative of said characteristics;
third means connected to said pickup means and being responsive to a particular portion in said electrocardiac signals for forming for each heart beat a reference signal that is representative of a normal configuration of said signal formed by said second means; and
fourth means responsive to said recurring signal as formed by said second means and to said recurring reference signal to provide an indication when the sampled characteristics deviates from the normal configuration in a particular manner.

References Cited by the Examiner
UNITED STATES PATENTS

| | | | |
|---|---|---|---|
| 2,492,617 | 12/1949 | Boland | 128—2.06 |
| 2,699,465 | 1/1955 | Hamilton | 128—2.06 |
| 2,713,120 | 7/1955 | Mostofsky | 128—423 |
| 2,815,748 | 12/1957 | Boucke | 128—2.05 |
| 2,827,040 | 3/1958 | Gilford | 128—2.05 |
| 2,865,365 | 12/1958 | Newland | 128—2.05 |

(Other references on following page)

UNITED STATES PATENTS

| | | | |
|---|---|---|---|
| 3,027,891 | 4/1962 | Fields | 128—2.06 |
| 3,030,946 | 4/1962 | Richards | 128—2.06 |
| 3,085,567 | 4/1963 | Vigilante | 218—2.05 |
| 3,087,487 | 4/1963 | Clynes | 128—2.1 |
| 3,087,488 | 4/1963 | Streimer | 128—2.05 |
| 3,123,768 | 3/1964 | Burch | 128—2.06 X |
| 3,129,704 | 4/1964 | Burt | 128—2.1 |
| 3,140,710 | 7/1964 | Glassner | 128—2.05 |
| 3,144,018 | 8/1964 | Head | 128—2.06 X |

OTHER REFERENCES

Holter, pp. 1214–1220, Science, October 20, 1961.
The Merck Manual, p. 164, tenth edition, 1961.

RICHARD A. GAUDET, *Primary Examiner.*

JORDAN FRANKLIN, *Examiner.*

S. BRODER, *Assistant Examiner.*

Disclaimer 3,267,934.—*William E. Thornton*, Chapel Hill, N.C. ELECTROCARDIAC COMPUTER. Patent dated Aug. 23, 1966. Disclaimer filed June 1, 1976, by the assignee, *Del Mar Engineering Laboratories*.

Hereby enters this disclaimer to claims 15 and 16 of said patent.

[*Official Gazette July 27, 1976.*]